United States Patent
Uchida

(10) Patent No.: US 8,111,315 B2
(45) Date of Patent: Feb. 7, 2012

(54) IMAGING DEVICE AND IMAGING CONTROL METHOD THAT DETECTS AND DISPLAYS COMPOSITION INFORMATION

(75) Inventor: Akihiro Uchida, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 616 days.

(21) Appl. No.: 12/253,011

(22) Filed: Oct. 16, 2008

(65) Prior Publication Data
US 2009/0102940 A1    Apr. 23, 2009

(30) Foreign Application Priority Data
Oct. 17, 2007    (JP) ................................ 2007-270207

(51) Int. Cl.
*H04N 5/335* (2011.01)
(52) U.S. Cl. ................................ 348/333.02
(58) Field of Classification Search ............... 348/222.1, 348/239, 333.02, 333.04
See application file for complete search history.

(56) References Cited

U.S. PATENT DOCUMENTS

| | | | |
|---|---|---|---|
| 6,806,906 B1 | 10/2004 | Soga et al. | |
| 7,170,632 B1 * | 1/2007 | Kinjo | 348/231.3 |
| 7,317,485 B1 * | 1/2008 | Miyake et al. | 348/333.02 |
| 2004/0174434 A1 | 9/2004 | Walker et al. | |
| 2004/0208114 A1 * | 10/2004 | Lao et al. | 369/125 |
| 2005/0179791 A1 | 8/2005 | Iga | |
| 2006/0098104 A1 * | 5/2006 | Fujii et al. | 348/222.1 |
| 2007/0002157 A1 | 1/2007 | Shintani et al. | |
| 2007/0014439 A1 * | 1/2007 | Ando | 382/118 |
| 2007/0177036 A1 | 8/2007 | Kawada | |
| 2008/0111889 A1 * | 5/2008 | Fujita et al. | 348/208.5 |
| 2008/0239104 A1 * | 10/2008 | Koh | 348/222.1 |
| 2009/0102942 A1 * | 4/2009 | Yoshizumi et al. | 348/222.1 |

FOREIGN PATENT DOCUMENTS

| | | |
|---|---|---|
| EP | 1 441 497 A2 | 7/2004 |
| EP | 1 703 437 A2 | 9/2006 |
| JP | 2000-341560 A | 12/2000 |
| JP | 2006-74368 A | 3/2006 |

* cited by examiner

*Primary Examiner* — Jason Whipkey
(74) *Attorney, Agent, or Firm* — Birch, Stewart, Kolasch & Birch, LLP

(57) ABSTRACT

An imaging device including an image pickup device which converts an optical image of a photographic subject received through an imaging lens into an image signal; a displaying device which displays a through-the-lens image based on the image signal; a person detecting device which detects one or more persons from the image signal; a distance calculating device which calculates a distance between a plurality of the detected persons; and a composition assisting device which displays on the displaying device information as to whether the distance between the detected persons is proper or not based on the calculated distance between the detected persons. Thereby, it is possible to obtain an image with a proper composition in a case when there are a plurality of persons being the photographic subjects.

12 Claims, 10 Drawing Sheets

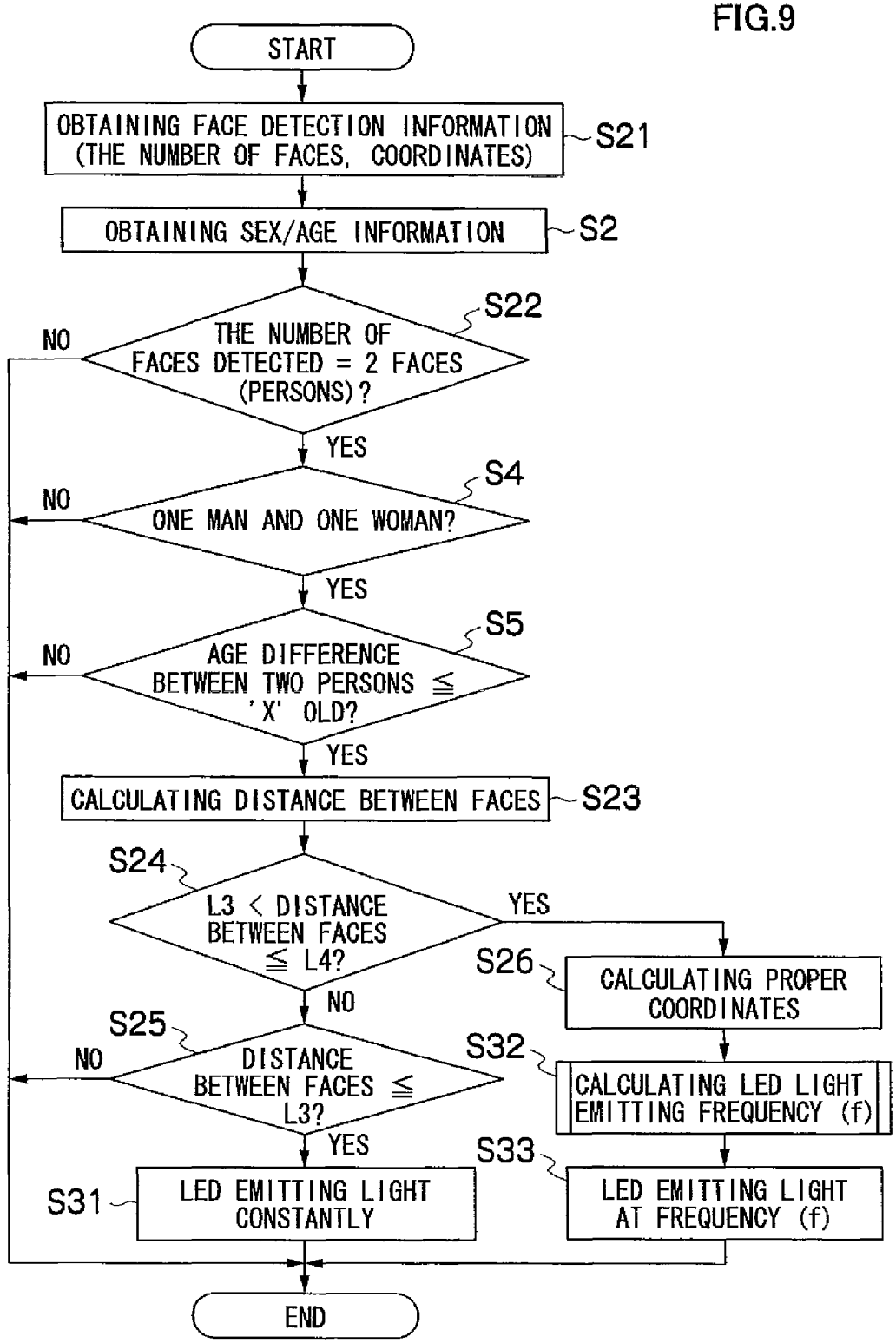

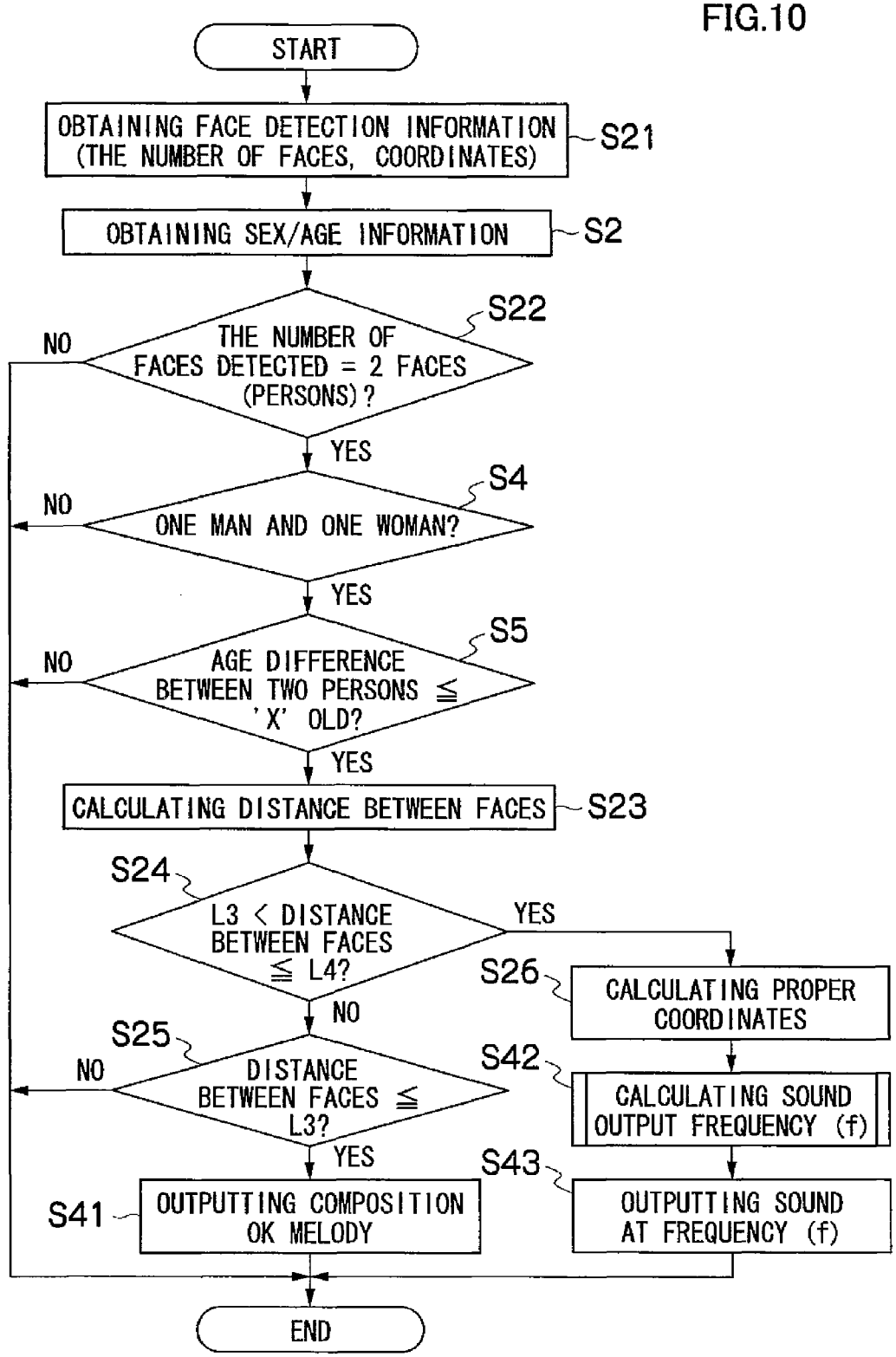

IMAGING DEVICE AND IMAGING CONTROL METHOD THAT DETECTS AND DISPLAYS COMPOSITION INFORMATION

BACKGROUND OF THE INVENTION

1. Field of the Invention

The present invention relates to an imaging device and an imaging control method which in particular are capable of notifying that a distance between photographic subjects of a man and a woman is not proper.

2. Description of the Related Art

Conventionally, a kind of a device which is capable of detecting a person from an image taken by an imaging device and providing composition assistance on the image is known. For example, Japanese Patent Application Laid-Open No. 2006-74368 discloses an electronic camera which is capable of outputting instructions for approximating a photographic subject to a shooting composition that a guiding display indicates on the basis of an area of the photographic subject extracted from image data. According to the technique disclosed in Japanese Patent Application Laid-Open No. 2006-74368, only by having the photographic subject or the photographer follow such instructions, it should be possible to approximate a shooting image to a composition that the photographer intends even under such condition that the guiding display is hard to see in the electronic camera. Moreover, Japanese Patent Application Laid-Open No. 2000-341560 discloses an imaging device which is capable of displaying, in an image being displayed on a liquid crystal display panel, a line-of-sight correction display for encouraging a correction in a line-of-sight direction of a photographic subject. According to the technique disclosed in Japanese Patent Application Laid-Open No. 2000-341560, it is possible to let the photographic subject know that his/her eye gaze or face direction is unnatural and encourage the photographic subject to turn to a direction that is natural.

SUMMARY OF THE INVENTION

In a case of shooting a scene where a man and a woman are positioned side by side, there is a possibility that the man and the woman will put some distance in between due to shyness. When the scene is shot in such situation, the outcome image might turn out unnatural. In this connection however, the techniques introduced in Japanese Patent Application Laid-Open No. 2006-74368 or Japanese Patent Application Laid-Open No. 2000-341560 are not capable of providing instructions for prompting proper composition to comply with situations with respect to the number of persons and sexes of the photographic subjects.

The object of the present invention is to resolve the above-described problems, and to provide an imaging device and an imaging control method which are capable of imaging an image with a proper composition complying with the number of persons and sexes of the photographic subjects.

For the purpose of achieving the above-mentioned object, according to a first aspect of the present invention, an imaging device comprises: an image pickup device which converts an optical image of a photographic subject received through an imaging lens into an image signal; a displaying device which displays a through-the-lens image based on the image signal; a person detecting device which detects one or more persons from the image signal; a distance calculating device which calculates a distance between a plurality of the detected persons; and a composition assisting device which displays on the displaying device information as to whether the distance between the detected persons is proper or not based on the calculated distance between the detected persons.

Thereby, it is possible to obtain an image with a proper composition in a case when there are a plurality of persons being the photographic subjects.

According to a second aspect of the present invention, the imaging device according to the first aspect further comprises a determining device which determines as to whether the calculated distance between the detected persons is longer than a first predetermined distance which is a proper distance, while the composition assisting device lets an icon indicating that composition change is needed be displayed in a case when the determining device determines that the distance between the detected persons is longer than the first predetermined distance whereas the composition assisting device lets an icon indicating that a composition is proper be displayed in a case when the determining device determines that the distance between the detected persons is shorter than or equal to the first predetermined distance.

Thereby, a photographer should be able to easily notice that the photographic subjects are in a proper composition.

According to a third aspect of the present invention, the imaging device according to the first aspect further comprises: a determining device which determines as to whether the calculated distance between the detected persons is longer than a first predetermined distance which is a proper distance; and a calculating device which calculates proper person positions for a proper composition with respect to the plurality of detected persons, while the composition assisting device lets frames be displayed on the calculated proper person positions for the proper composition in a case when the determining device determines that the distance between the detected persons is longer than the first predetermined distance.

Thereby, it is possible to guide the persons as being the photographic subjects to proper positions for a proper composition.

According to a fourth aspect of the present invention, in the imaging device according to the third aspect, the proper person positions for the proper composition are defined as positions where the distance between the detected persons becomes the first predetermined distance, and where the positions of the plurality of the detected persons are shifted to become mutually symmetric about a vertical line that passes through the center of a lateral line connecting the positions of the plurality of the detected persons.

Thereby, it is possible to display frames on proper positions for a proper composition.

For the purpose of achieving the above-mentioned object, according to a fifth aspect of the present invention, an imaging device comprises: an image pickup device which converts an optical image of a photographic subject received through an imaging lens into an image signal; a person detecting device which detects one or more persons from the image signal; a distance calculating device which calculates a distance between a plurality of the detected persons; and a composition assisting device which notifies the photographic subjects as to whether the distance between the detected persons is proper or not based on the calculated distance between the detected persons.

Thereby, it is possible to obtain an image with a proper composition in a case when there are a plurality of persons being the photographic subjects.

According to a sixth aspect of the present invention, in the imaging device according to the fifth aspect, the composition assisting device is provided with a light emitting device.

Thereby, the persons as being the photographic subjects are able to know whether they are in a proper composition by only looking at the light emitting device.

According to a seventh aspect of the present invention, the imaging device according to the sixth aspect further comprises a determining device which determines as to whether the calculated distance between the detected persons is longer than a first predetermined distance which is a proper distance, while the composition assisting device lets the light emitting device emit light depending on the determination result at the determining device.

Thereby, it is possible to easily know whether the persons as being the photographic subjects have a proper distance in between.

According to an eighth aspect of the present invention, in the imaging device according to the seventh aspect, the composition assisting device lets the light emitting device emit blinking lights in a case when the determining device determines that the distance between the detected persons is longer than the first predetermined distance, and lets the light emitting device emit light constantly in a case when the determining device determines that the distance between the detected persons is shorter than or equal to the first predetermined distance.

Thereby, it is possible to easily know whether the persons as being the photographic subjects have a proper distance in between.

According to a ninth aspect of the present invention, in the imaging device according to one of the sixth to eighth aspects, the composition assisting device changes a blinking frequency of the light emitting device depending on the distance between the detected persons.

Thereby, it is possible to easily know whether the persons as being the photographic subjects have a proper distance in between.

According to a tenth aspect of the present invention, in the imaging device according to one of the fifth to ninth aspects, the composition assisting device is provided with a sound generating device.

Thereby, the persons as being the photographic subjects are able to know whether they are in a proper composition by only hearing a sound outputted from the sound generating device.

According to an eleventh aspect of the present invention, the imaging device according to one of the fifth to tenth aspects further comprises a determining device which determines as to whether the calculated distance between the detected persons is longer than a first predetermined distance which is a proper distance, while the composition assisting device lets a sound be generated from the sound generating device depending on the determination result at the determining device.

Thereby, it is possible to easily know whether the persons as being the photographic subjects have a proper distance in between.

According to a twelfth aspect of the present invention, in the imaging device according to one of the fifth to eleventh aspects, the composition assisting device changes an output sound frequency of the sound generating device depending on the distance between the detected persons.

Thereby, it is possible to easily know whether the persons as being the photographic subjects have a proper distance in between.

According to a thirteenth aspect of the present invention, in the imaging device according to one of the first to twelfth aspects, the person detecting device is to detect one or more faces of persons.

Thereby, it is possible to easily detect persons, and what is more, it is possible to calculate a distance between the detected persons with improved accuracy.

According to a fourteenth aspect of the present invention, the imaging device according to one of the first to thirteenth aspects further comprises: a sex determining device which determines sexes of the detected persons; and a device which enables the composition assisting device in a case when the plurality of the detected persons are one man and one woman and disables the composition assisting device in other cases.

Thereby, the composition assistance will not work in cases other than the case where the photographic subjects are a couple of a man and a woman, by which wasteful power consumption due to unnecessary operations can be prevented.

According to a fifteenth aspect of the present invention, the imaging device according to one of the first to fourteenth aspects further comprises: an age determining device which determines ages of the plurality of the detected persons; and a device which enables the composition assisting device in a case when an age difference between the plurality of the detected persons is within a predetermined age and disables the composition assisting device in a case when the age difference between the plurality of the detected persons is over the predetermined age.

Thereby, the composition assistance will not work in cases other than the case where the age difference between the detected persons as being the photographic subjects is close enough, by which wasteful power consumption due to unnecessary operations can be prevented.

According to a sixteenth aspect of the present invention, the imaging device according to one of the first to fifteenth aspects further comprises: a storing device which stores a second predetermined distance being larger than the first predetermined distance; and a device which enables the composition assisting device in a case when the distance between the detected persons is shorter than or equal to the stored second predetermined distance and disables the composition assisting device in a case when the distance between the detected persons is longer than the stored second predetermined distance.

Thereby, the composition assistance will not work by mistake when it so happened that a person who has nothing to do with the shooting intention enters into the shooting image, by which wasteful power consumption due to unnecessary operations can be prevented.

According to a seventeenth aspect of the present invention, the imaging device according to one of the first to sixteenth aspects further comprises an input device which allows a user to set a shooting mode, while the input device is capable of being set to one of the shooting modes including a shooting mode that enables the composition assisting device and a shooting mode that disables the composition assisting device.

Thereby, it is possible to use the composition assistance only when it is necessary, by which wasteful power consumption due to unnecessary operations can be prevented.

For the purpose of achieving the above-mentioned object, according to an eighteenth aspect of the present invention, an imaging control method comprises: conducting imaging by converting an optical image of a photographic subject received through an imaging lens into an image signal; displaying a through-the-lens image based on the image signal; detecting one or more persons from the image signal; calculating a distance between a plurality of the detected persons; and providing composition assistance by displaying information as to whether the distance between the detected persons is proper or not based on the calculated distance between the detected persons.

Thereby, it is possible to obtain an image with a proper composition in a case when there are a plurality of persons being the photographic subjects.

For the purpose of achieving the above-mentioned object, according to a nineteenth aspect of the present invention, an imaging control method comprises: conducting imaging by converting an optical image of a photographic subject received through an imaging lens into an image signal; detecting one or more persons from the image signal; calculating a distance between a plurality of the detected persons; and providing composition assistance by notifying the photographic subjects as to whether the distance between the detected persons is proper or not based on the calculated distance between the detected persons.

Thereby, it is possible to obtain an image with a proper composition in a case when there are a plurality of persons being the photographic subjects.

According to the present invention, it is possible to provide an imaging device and an imaging control method which are capable of imaging an image with a proper composition complying with the number of persons and sexes of the photographic subjects.

BRIEF DESCRIPTION OF THE DRAWINGS

FIG. 9 is a flow chart explaining an operation for carrying out an assistance display according to a third embodiment of the present invention; and FIG. 10 is a flow chart explaining an operation for carrying out an assistance display according to a fourth embodiment of the present invention.

DETAILED DESCRIPTION OF THE PREFERRED EMBODIMENTS

In the following, preferred embodiments of the present invention will be described with reference to the drawings.

First Embodiment

Figure 1B:
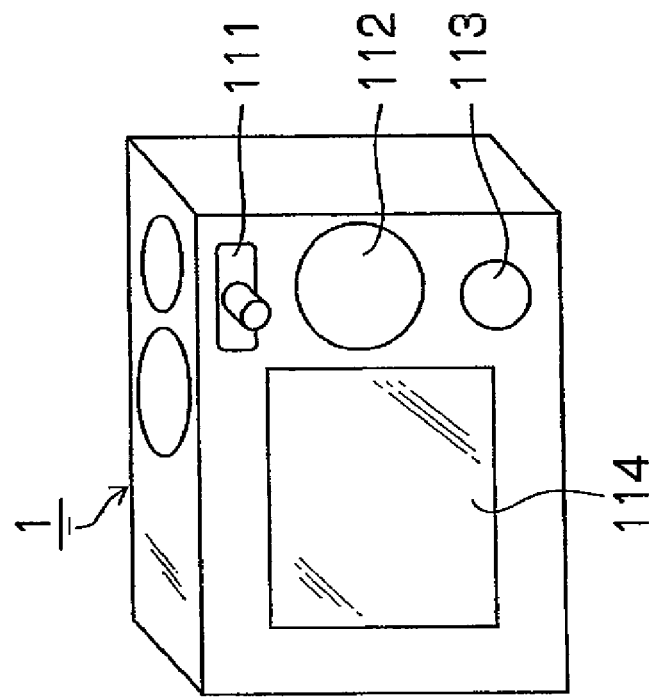
FIGS. 1A and 1B are external views of a digital camera 1 according to the present invention.
Figure 1A:
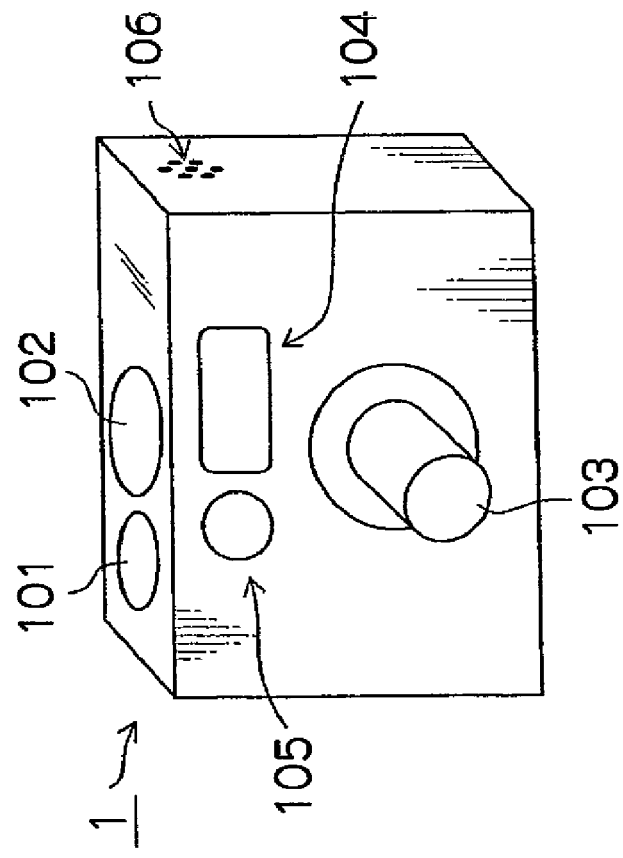

FIG. 1A is an external view showing a front of a digital camera 1 according to a first embodiment of the present invention, and FIG. 1B is an external view showing a back of the digital camera 1.

The digital camera 1 is provided with a function of recording and reproducing still images and moving images, and it is provided with a release switch 101 and a mode dial 102 on the upper surface thereof.

By turning the mode dial 102, it is possible to set the digital camera 1 to either a scene position mode, which allows you to select from among the options including an automatic shooting mode, a manual shooting mode, a person mode, a scenery mode, a night view mode and so forth, or a moving image shooting mode. In addition, the release switch 101 includes a switch S1 and a switch S2. The switch S1 turns ON when the release switch 101 is pressed hallway down and it allows you to attend to shooting preparations such as focus locking, photometric procedure, etc. On the other hand, the switch S2 turns ON when the release switch 101 is pressed all the way down and it allows you to carry out image capturing.

In the back of the digital camera 1, a zoom lever 111, an operation button 112, a menu button 113 and a LCD 114 are provided.

The LCD 114 can be used as an electronic viewfinder while it displays a moving image (through-the-lens image), and it is also capable of displaying shot images before recording (preview images) and reproduced images, etc. read out from a recording medium being loaded on the camera. In addition, the LCD 114 is capable of displaying all kinds of menu screens for manually setting an operation mode of the camera, white balance, number of pixels in the image, sensitivity, etc., in response to an operation by the mode dial 102 or the menu button 113, and it is capable of displaying a screen for graphical user interface (GUI) which allows you to set manual setting items by an operation through the operation button 112. The zoom lever 111 is an operation lever for zooming a shooting image.

In the front of the digital camera 1, a shooting lens 103, a flash light emitting portion 104 and a LED 105 are provided. Furthermore, a speaker 106 is provided in the side of the digital camera 1.

The shooting lens 103 is to be driven in response to an operation by the zoom lever 111 and enables to change zooming magnification. The flash light emitting portion 104 is to set off a flash as an auxiliary shooting light in a case when there is insufficient light on a photographic subject. The LED 105 will mainly function to notify the photographic subject with a remaining time in a self-timer period by its blinking intervals, although it will also be used in composition assistance, as will be described later on. Likewise, the speaker 106 will also be used in the composition assistance.

Figure 2:
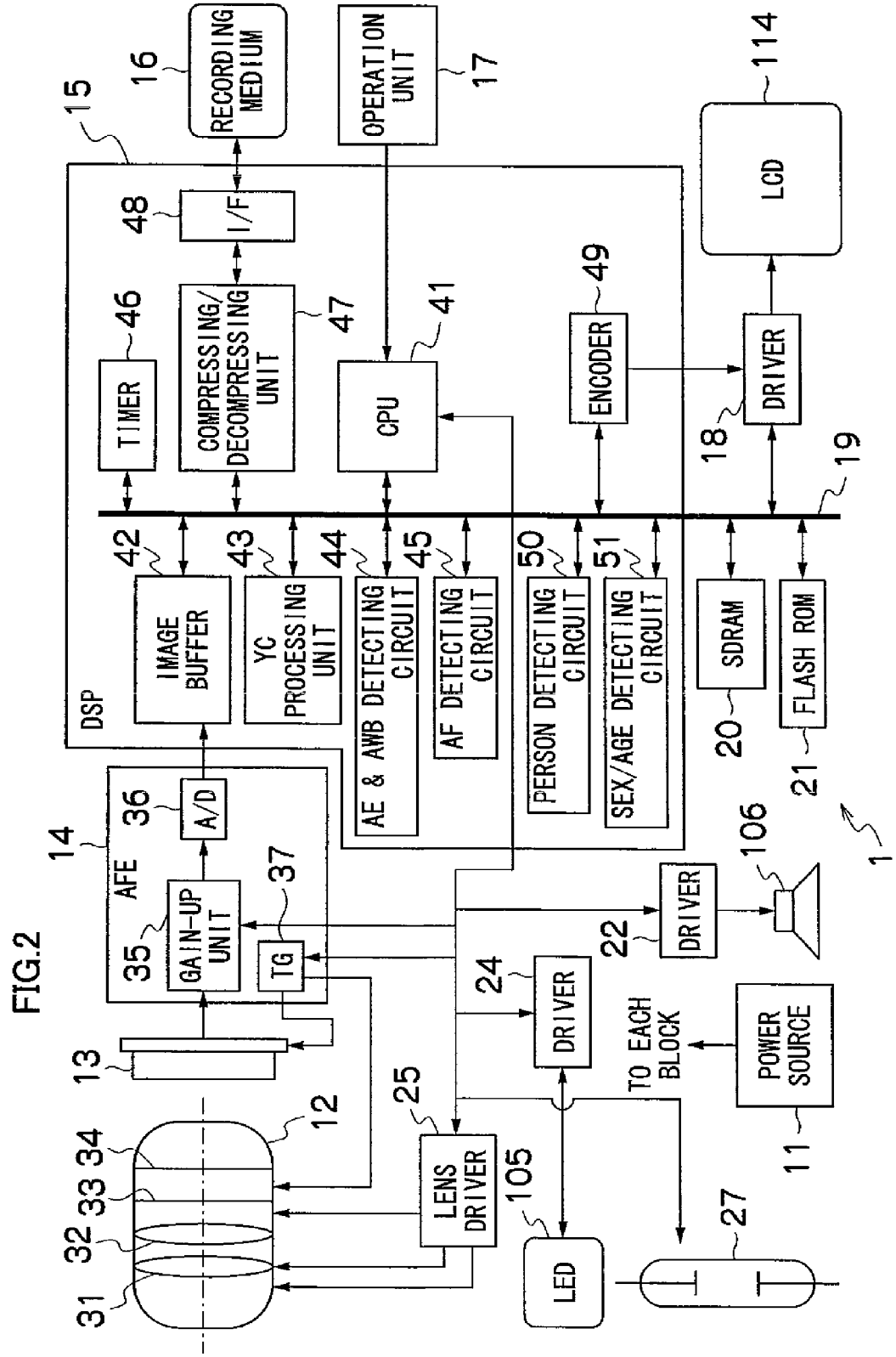
FIG. 2 is a block diagram showing an example of an internal structure of the digital camera 1.

FIG. 2 is a block diagram showing an example of an internal structure of the digital camera 1 shown in FIG. 1. As shown in the diagram, the digital camera 1 is provided with a power source 11, a shooting optical system 12, an image pickup element (CCD) 13, an AFE (analog front end) 14, a DSP (digital signal processor) 15, a recording medium 16, an operation unit 17, a LCD driver 18, a system bus 19, a SDRAM 20, a flash ROM 21, a flash 27, a LED 105, a speaker 106, a LCD 114, and further with drivers 22, 24 and 25 which are connected with a serial I/O terminal of the DSP 15 and are functioning to drive the shooting optical system 12, the LED 105, the speaker 106 and so forth.

The power source 11 includes a battery and a power source controlling unit, which are unshown, and it is to supply power to each block of the digital camera 1.

Each block of the digital camera 1 being power supplied is to operate under the control of a CPU 41 provided in the DSP 15. The CPU 41 is to control each unit of the digital camera 1 by executing a predetermined control program on the basis of an input from the operation unit 17. Meanwhile, the operation unit 17 is structured as including the release switch 101, the mode dial 102, the zoom lever 111, the operation button 112, the menu button 113, etc. shown in FIG. 1, and it is to output signals depending on operations to the CPU 41.

In the flash ROM 21, in addition to the control programs for the CPU 41 to execute, there are various parameters necessary for the control operations, pixel defect data of the CCD 13, etc. being recorded. The CPU 41 is to read out the control programs recorded in the programmable ROM onto the SDRAM 20 and sequentially execute the control programs to control respective units in the digital camera 1. Meanwhile, besides being used as an execution processing area for the programs, the SDRAM 20 is used as a temporary storage area for image data, etc. and as various work areas.

The shooting optical system 12 is composed of a zoom lens 31, a focus lens 32, an iris diaphragm 33 and a shutter 34, while each of which is to be driven by the lens driver 25 according to the instruction of the CPU 41.

The zoom lens 31 and the focus lens 32 are to move back and forth on the same optical axis to perform zooming and focusing, respectively. These lenses are composing the shooting lens 103. The iris diaphragm 33 is to control the amount of light entering the CCD 13 and perform exposure control in accord with a shutter speed. The shutter 34 is to operate so as to let the photographic subject light passing through the zoom lens 31, the focus lens 32 and the iris diaphragm 33 enter the CCD 13 for a predetermined period of time.

The CCD 13 is arranged at a latter stage of the shutter 34, and it is to receive the photographic subject light entering through the shooting optical system 12. As is well known, the CCD 13 is provided with a light receiving surface where a plurality of light receiving elements are arranged in a form of matrix. The photographic subject light entering through the shooting optical system 12 will form an image on the light receiving surface of the CCD 13 and will be converted into electrical signals by respective light receiving elements.

The AFE 14 is composed of a gain-up unit 35, an A/D converter 36 and a timing generator 37. The CCD 13 is to synchronize with a vertical transfer clock and a horizontal transfer clock supplied by the timing generator 37 and outputs an electrical charge stored in each pixel by one line at a time as a serial image signal. The CPU 41 is to control a drive of the CCD by controlling the timing generator 37.

A charge storage period (exposing period) of each pixel is to be determined based on an electronic shutter driving signal given by the timing generator 37. The CPU 41 is to instruct the timing generator 37 on the charge storage period.

Outputting of the image signal is to start as the digital camera 1 is set to a shooting mode. That is, when the digital camera 1 is set to a shooting mode, a through-the-lens image will be displayed on the LCD 114 whereby the outputting of the mage signal is to start. The outputting of the image signal for the through-the-lens image will once stop when an instruction on a real shooting is passed, then the outputting of the image signal will start again once the real shooting ends.

The image signal outputted by the CCD 13 is an analog signal and this analog signal is to be taken up by the gain-up unit 35.

The gain-up unit 35 is structured as including a correlated double sampling (CDS) circuit and an automatic gain control (AGC) circuit. The CDS circuit is to remove a noise included in the image signal, whereas the AGC circuit is to amplify the image signal with the noise being removed by a predetermined gain. The analog image signal on which necessary signal processing is performed by the gain-up unit 35 is to be taken up by the A/D converter 36.

As the A/D converter 36 takes up the analog image signal, it is to convert the analog image signal into a digital image signal having a graduation width of predetermined bits. This image signal is what is called a RAW data including graduation values indicating concentrations of R, G and B with respect to each pixel. This digital image signal is to be taken up by the DSP 15.

Other than the CPU 41 mentioned above, the DSP 15 is further provided with an image buffer 42, a YC processing unit 43, an AE & AWB detecting circuit 44, an AF detecting circuit 45, a timer 46, a compressing/decompressing unit 47, a recording media interface 48, a video encoder 49, a person detecting circuit 50, a sex/age detecting circuit 51, etc. These components are connected with the system bus 19 and they are capable of transmitting and receiving information with one another through the system bus 19.

The image buffer 42 is to store the image signals of one segment portion as it takes them up from the A/D converter 36. The AF detecting circuit 45 is to follow the instruction of the CPU 41 and take up the R, G and B image signals stored in the image buffer 42 to calculate a focus evaluation value required in AF (automatic focus) control. This AF detecting circuit 45 includes a high-pass filter for passing only the high frequency component of the G signal, an absolute value rendering processing unit, a focus area extracting unit for cutting out the signal inside a predetermined focus area being set on the screen, and an integrating unit for integrating absolute value data inside the focus area. The AF detecting circuit 45 is to output the integrated absolute value data inside the focus area having been obtained at the integrating unit to the CPU 41 as a focus evaluation value. At the time of AF control, the CPU 41 is to search for a position where the focus evaluation value outputted from the AF detecting circuit 45 becomes local maximum, and move the focus lens 32 toward the searched position to perform focusing on a main photographic subject.

The AE & AWB detecting circuit 44 is to follow the instruction of the CPU 41 and take up the R, G and B image signals being stored in the image buffer 42 to calculate and obtain an integrated value required in the AF control. The CPU 41 is to calculate a luminance value based on the integrated value, and obtain an exposure value on the basis of the luminance value. Moreover, the CPU 41 is to determine a diaphragm value and a shutter speed according to a predetermined program line based on the exposure value. Furthermore, the AE & AWB detecting circuit 44 is to apply a digital gain on the image signals of one segment portion being stored in the image buffer 42 depending on a kind of light source, so as to perform a white balance adjustment, and along with that, the AE & AWB detecting circuit 44 is to perform gamma (graduation characteristic) processing and sharpness processing to produce R, G and B signals. The YC processing unit 43 is to perform predetermined signal processing on the image signal of each of the colors R, G and B being taken up point-based sequentially to generate an image signal (Y/C signal) composed of a luminance signal Y and a color difference signal Cr or Cb. This Y/C signal is to be stored in the SDRAM 20.

The compressing/decompressing unit 47 is to follow a compression instruction of the CPU 41 and perform compression processing on the inputted Y/C signal according to a predetermined format (JPEG format for instance) so as to generate compressed image data. In addition, the compressing/decompressing unit 47 is to follow a decompression instruction of the CPU 41 and perform decompression processing on the inputted compressed image data according to a predetermined format so as to generate uncompressed image data.

The video encoder 49 is to follow the instruction of the CPU 41 and control displays on the LCD via the LCD driver 18.

The recording media interface 48 is to follow the instruction of the CPU 41 and control reading/writing of data with respect to the recording medium 16. Here, the recording medium can be a kind, such as a memory card, which is removable with respect to the camera body. Or else, the recording medium can be a kind that is built into the camera body. In the case of having a removable recording medium, the camera body should be equipped with a card slot so that the removable recording medium can be used by being loaded on the card slot.

The timer 46 is to time a timer period in a self timer mode.

The person detecting circuit 50 is to detect one or more persons from the image signal stored in the SDRAM 20. This person detection is performed by first carrying out edge detection on a target image for the person detection and then by searching through the image having undergone the edge detection for a shape that matches with a person shape model. In addition, the person detecting circuit 50 is to output data on the number of detected persons and associated coordinates and sizes.

The sex/age detecting circuit 51 is to detect the sex and age of the detected person on the basis of person's face area detected by the person detecting circuit 50. Age estimation of the detected person is to be based on shades and shapes in particular areas of the person's face such as lines at the corners of the eyes, sag of the jaw, wrinkles under the eyes, wrinkles on the forehead, status of the head hair, etc. Specifically, feature values such as an edge reinforcement value, a color data and so forth in the particular areas of the face are calculated to be cross-checked with a previously prepared age data which suggests correspondence of feature values to certain ages, and a certain age corresponding to the calculated feature values is to be selected as the estimated age of the photographic subject. Moreover, the sex of the photographic subject is to be determined based on the sex corresponding to a face image data that matches the face area of the photographic subject when face detection is performed. At this time, in a case when there are a number of matching image data estimating both sexes, the sexes of the image data are to be enumerated whereby the sex most enumerated is to be determined as the sex of the photographic subject. The sex/age detecting circuit 51 is to output data on age and sex with respect to each of the detected faces.

Figure 3:
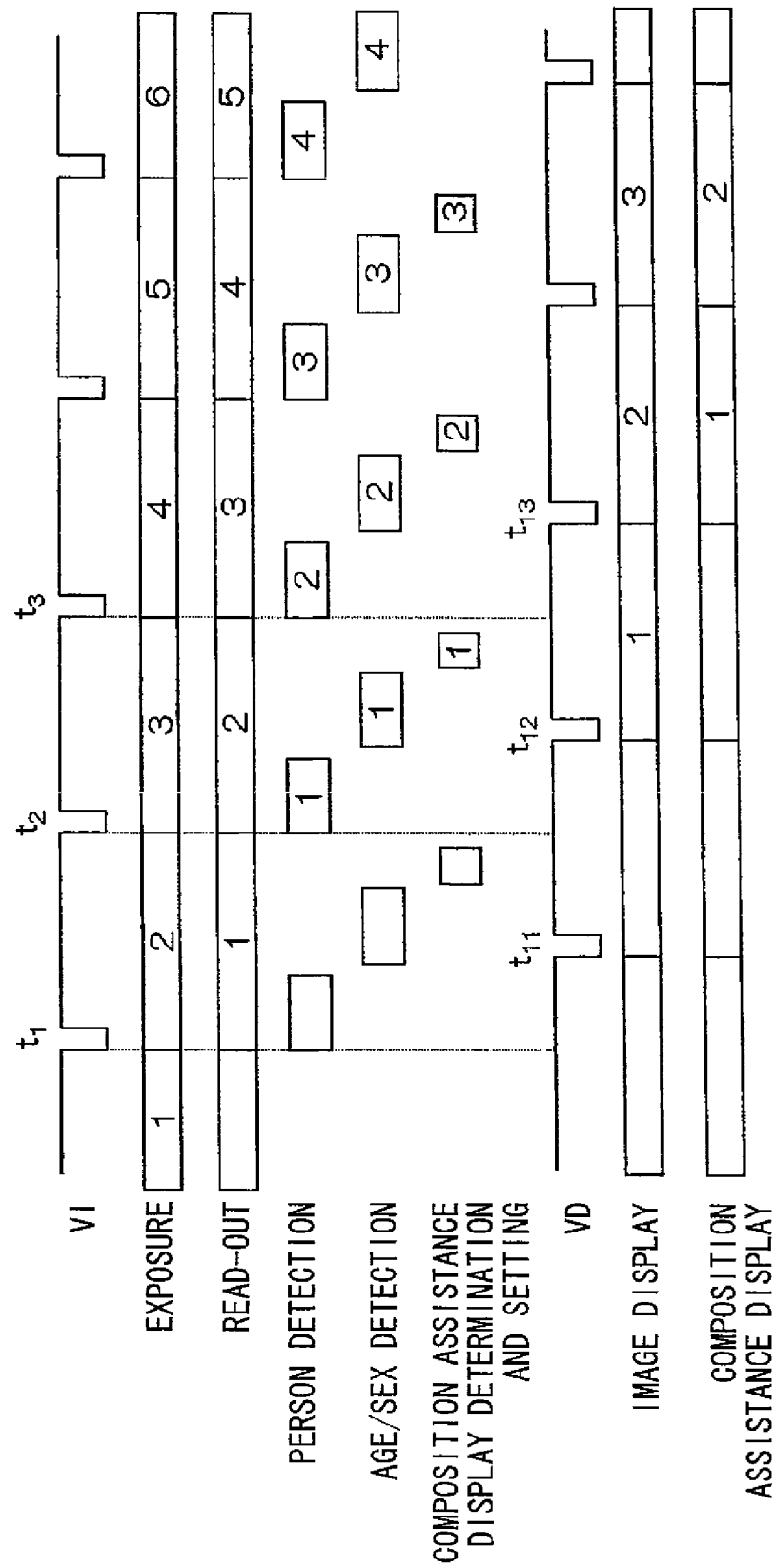
FIG. 3 is a timing chart of an operation for carrying out an assistance display.

Now, a composition assistance display according to the present embodiment of the invention will be described. The present composition assistance display is to be provided as overlapping a display of a through-the-lens image. FIG. 3 is a timing chart of an operation for carrying out the assistance display on the LCD 114 simultaneously with the display of the through-the-lens image.

In this timing chart, a reference character VI designates a vertical synchronizing signal of an image pickup system, and exposure and read-out are to be carried out by turns in synchronization with this VI signal. For instance, a charge (image 1) accumulated in the CCD 13 due to exposure up till then will be forwarded to a vertical transferring path in synchronization with the VI signal that changes from H level to L level at timing t1 so as to let read-out start. At this point, the next exposure (image 2) will also start at the same time.

At the next timing t2 of the VI signal, exposure of the image 2 will be completed while read-out of the image 2 will start. At this point, exposure of an image 3 will also start at the same time. Furthermore, the image 1 having been through with the read-out is to go thorough face detection. As mentioned earlier, the image signal having been through with the read-out is stored in the SDRAM 20, and the person detecting circuit 50 is to detect the person's face area based on this signal.

When the person detecting circuit 50 is finished with the person detection, sex/age detection by the sex/age detecting circuit 51 is to start next. Then the CPU 41 is to perform determination and setting of the composition assistance display with respect to the detected person. The action sequence of the person detection to the setting of the composition assistance display should be completed by the next timing of the VI signal.

At timing t3 of the VI signal, exposure of the image 3 will be completed while read-out of the image 3 will start. At this point, exposure of an image 4 will also start at the same time. In addition, the image 2 having been through with the read-out is to go through face detection.

A reference character VD shown in FIG. 3 designates a vertical synchronizing signal for display on the LCD 114, and it is asynchronous with the VI signal. The setting of the composition assistance display having been completed by the timing t3 will be reflected on an image display at the next timing t13 of the VD signal. Since the latest image having been read out is being displayed on the LCD 114, the composition assistance display based on the results of the person detection and sex/age detection with respect to the image 1 will be displayed on the LCD 114 along with a through-the-lens image of the image 2 at the timing t13.

Figure 4:
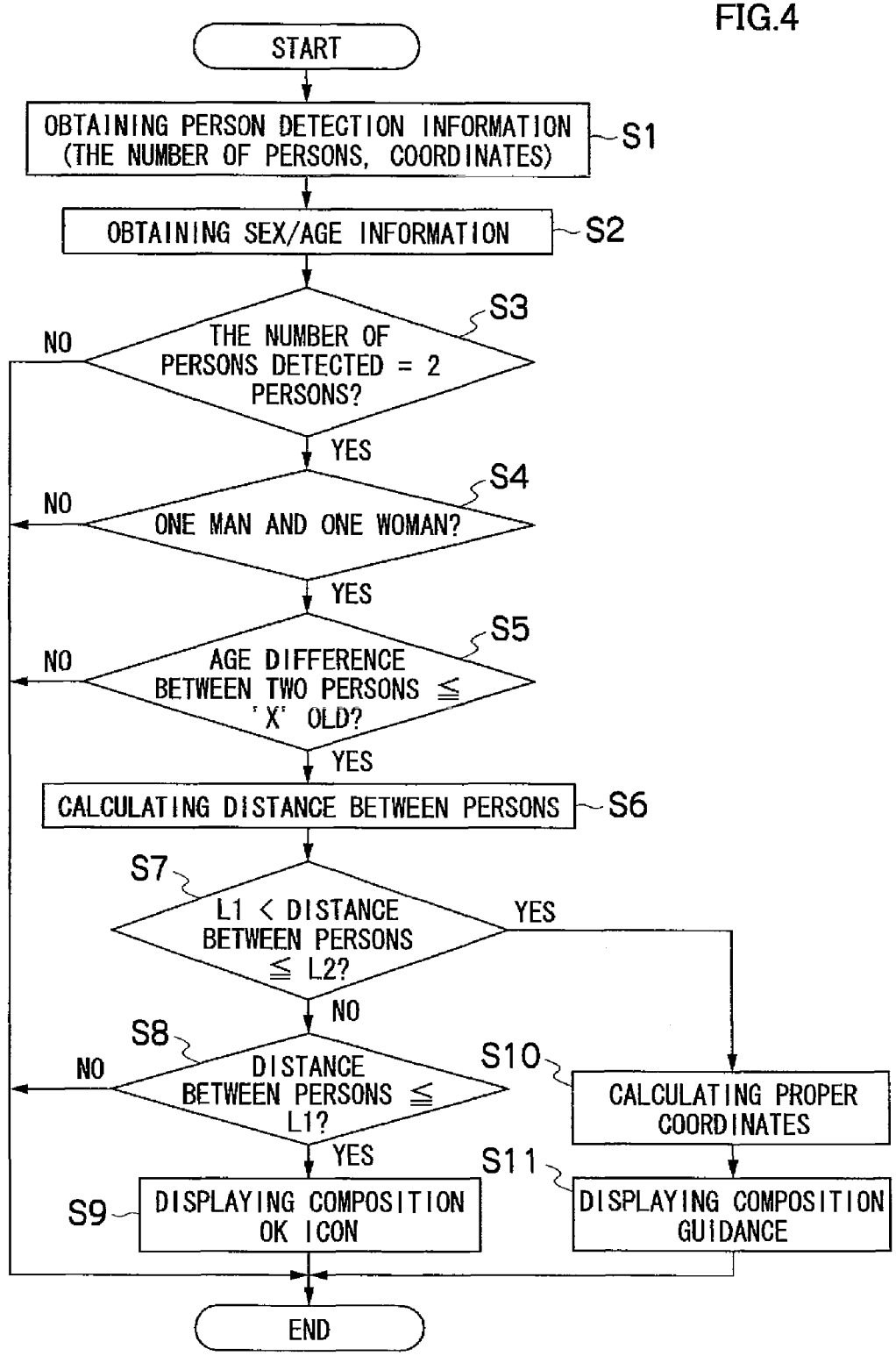
FIG. 4 is a flow chart explaining an operation in a composition assisting mode.

Now, composition assistance shooting according to the present embodiment of the invention will be described. FIG. 4 is a flow chart explaining an operation in the composition assistance shooting.

When a composition assistance mode is set by the operation unit 17, a through-the-lens image will be displayed, and along with that, persons inside the through-the-lens image are to be detected and the number of detected persons and associated coordinates will be obtained (step S1). As mentioned earlier, the person detection is to be performed by the person detecting circuit 50. With respect to the detected persons, person detection frames 61 are to be displayed in a way overlapping the persons on the through-the-lens image. Moreover, information on age and sex with respect to the detected persons will be obtained (step S2). The age and sex detection is to be performed by the sex/age detecting circuit 51.

Next, based on the detection result at step S1, it is to be determined as to whether the number of detected persons is two or not (step S3). If it is not two, the process is to end. If the number of persons in the image is two, it is to be determined as to whether the two persons are one man and one woman, based on the detection result at step S2 (step S4). If both of the two persons are men or women, the process is to end. If the two persons are one man and one woman, it is to be determined as to whether their age difference is within a predetermined value or not, based on the detection result at step S2 (step S5). If their age difference is greater than the predetermined value, the process is to end.

If the age difference between the two persons is within the predetermined value, a distance between the two persons is to be calculated based on the result at step S1 (step S6). A distance $D_{person}$ between adjacent persons is to be calculated using the following expression.

$$D_{person} = H_{p0} \times d_p \div h_p \qquad \text{[Expression 1]}$$

Here, the value $H_{p0}$ designates a common vertical size (unit: m) of a person, the value $h_p$ designates a vertical size (unit: pixel) of one person in the a through-the-lens image, and the value $d_p$ designates a distance between person areas (unit: pixel).

The distance $D_{person}$ between adjacent persons calculated in such way is to be determined as to whether it is within a range of L1 to L2 not including L1 but L2 (step S7). If the distance $D_{person}$ is not within the range of L1 to L2 not including L1 but L2, it is to be determined as to whether it is L1 or shorter (step S8). If the distance $D_{person}$ is over L2, it will be determined that the two persons as being the photographic subjects do not have any intention of being photographed as being side by side in the first place, and thus the process is to end. If the distance $D_{person}$ is L1 or shorter, it will be determined that the persons are in a proper composition, whereby a composition OK icon 62 is to be displayed (step S9). The composition OK icon 62 is to be displayed in a way overlapping the through-the-lens image.

Figure 5A:
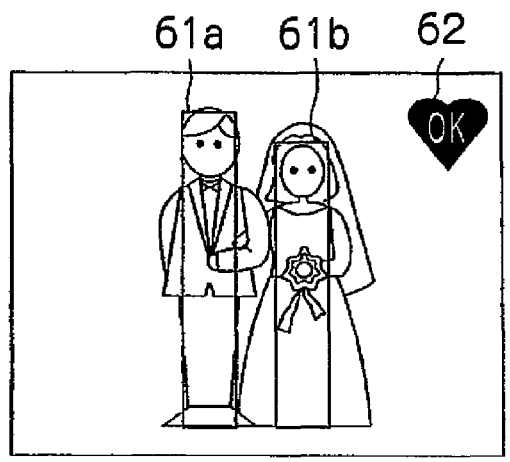
FIGS. 5A to 5C are diagrams showing and explaining assistance displays in the composition assisting mode.

FIG. 5A is a diagram showing a display on the LCD 114 in this case. As can be noted, in addition to person detection frames 61a and 61b for the two persons of one man and one woman, the composition OK icon 62 is also displayed in a way overlapping the through-the-lens image. By confirming this composition OK icon 62, the photographer can recognize that the photographic subjects are in a proper composition whereby he/she can do the shooting.

In the case when it is determined at step S7 that the calculated distance $D_{person}$ between the adjacent persons is within the range of L1 to L2 not including L1 but L2, it will be determined that the two persons as being the photographic subjects have the intentions of being photographed together as being side by side although they are too apart from each other, and thus proper coordinates for a proper composition are to be calculated (step S10). Proper person positions are positions that can be set by shifting the current positions in the horizontal direction only, while the center of a distance between the current positions and the center of a distance between the proper positions in the horizontal direction, respectively, should coincide and a distance between the centers of the proper positions should become the proper distance L1. For example, as shown in FIG. 5C, supposing that the current positions are 71a and 71b, the proper positions will be 73a and 73b, which are symmetric about a vertical center line 75 that passes through the midpoint of a distance between the current positions 71a and 71b, and where a distance between the two persons becomes L1. Coordinates of such proper positions are to be calculated and a composition change instruction icon 64 is to be displayed (step S11).

Figure 5B:
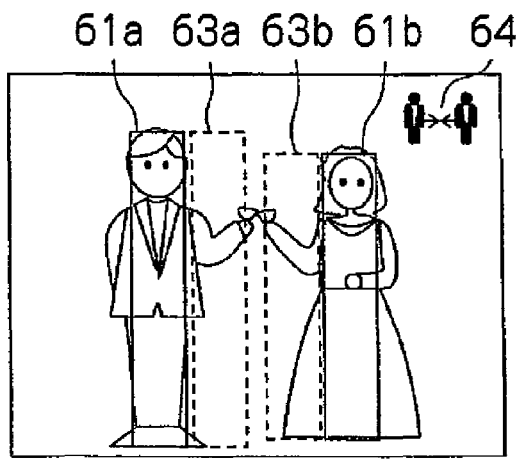
Figure 5C:
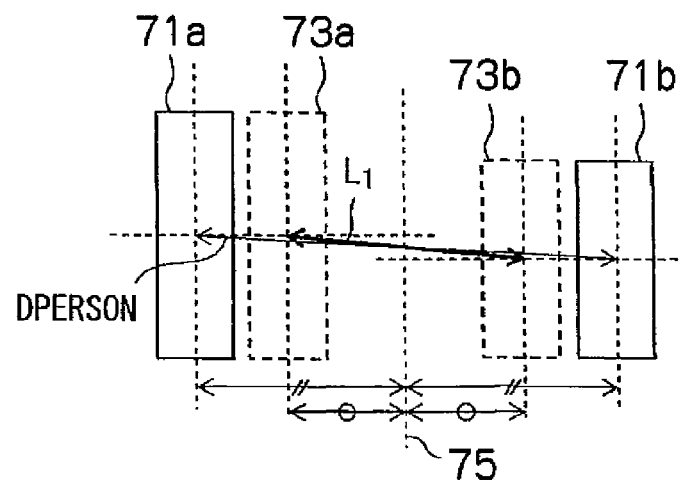

FIG. 5B is a diagram showing a display on the LCD 114 in this case. As can be noted, along with the person detection frames 61a and 61b for the two persons of one man and one woman, proper position frames 63a and 63b and further the composition change instruction icon 64 are also displayed in a way overlapping the through-the-lens image. These proper position frames 63a and 63b are displayed on the proper positions 73a and 73b which are being calculated at step S10. In addition, the proper position frames 63 should be displayed as blinking with a different color from the person detection frames 61 in order to easily distinguish between the proper position frames 63 and the person detection frames 61.

Therefore, while looking at these proper position frames 63a and 63b, the photographer should be able to suggest the two persons as being the photographic subjects to come closer to each other. Moreover, when the composition change instruction icon 64 is turned to the composition OK icon 62 as a result of the two photographic subjects coming close enough to each other, the photographer can recognize that the photographic subjects are in a proper composition whereby he/she can do the shooting. In addition, even in a case when the digital camera 1 is turned to a vertical position for shooting, the composition OK icon 62 or the composition change instruction icon 64 can be displayed in the same vertical direction. In this way, by displaying the icon in the same direction as the face direction, it is possible to realize an easily viewable display.

In the present embodiment, although the photographer is supposed to be the one who can confirm the composition change instruction icon 64, the proper position frames 63, etc. on the LCD 114, it is also possible to arrange such that the LCD 114 can be turned to the side of the photographic subjects so that the persons as being the photographic subjects can do the confirmation.

Furthermore, although the composition assisting mode is set by the operation unit 17 in the present embodiment, it is also possible to arrange such that a normal shooting mode is automatically shifted to the composition assisting mode in a case when persons of one man and one woman are detected under the normal shooting mode.

Second Embodiment

Figure 6:
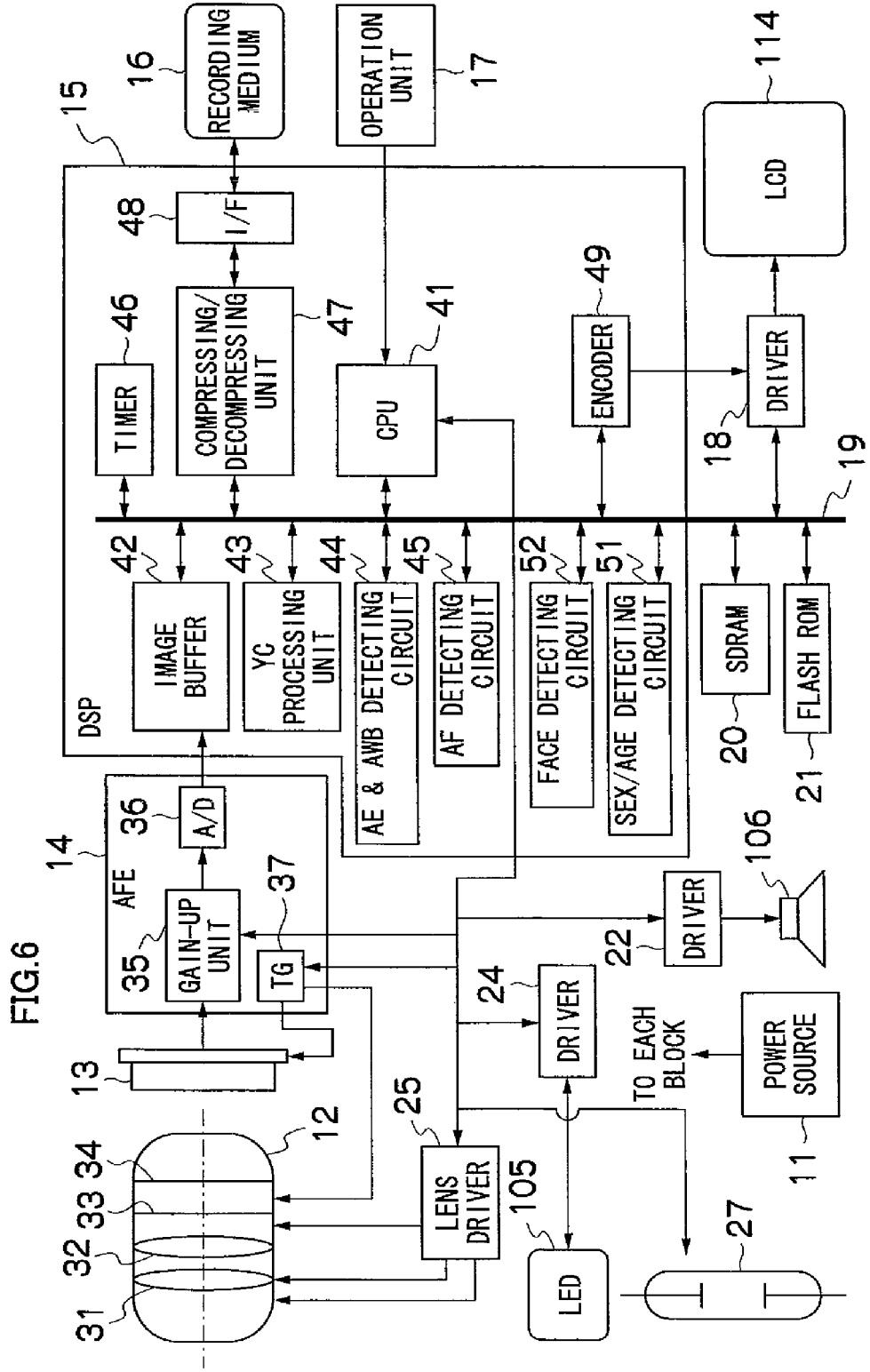
FIG. 6 is a block diagram showing an example of an internal structure of a digital camera 1 according to a second embodiment of the present invention.

Now, composition assistance according to a second embodiment of the present invention will be described. FIG. 6 is a block diagram showing an example of an internal structure of a digital camera 1 according to the second embodiment of the present invention. In FIG. 6, what is different from the block diagram shown in FIG. 2 is that a face detecting circuit 52 is provided in the digital camera 1 instead of the person detecting circuit 50. The digital camera 1 according to the second embodiment of the invention is to detect one ore more persons in the photographic subjects by performing face detection.

The face detecting circuit 52 is to detect a face area of a person from an image signal stored in the SDRAM 20. In this face area detection, first, a predetermined number of resized images with different resolutions with respect to the target image of detection are to be prepared. Next, from the entire resized images, areas having one or more matches in previously prepared image data about a plurality of faces of predetermined sizes are to be extracted. The resized image having the largest number of extracted areas is to be selected, and the extracted areas within the selected resized image are to be enlarged or reduced to comply with the original size of the image before being resized. The area obtained by this process is to be defined as a face of the photographic subject. Lastly, the face detecting circuit 52 is to output data on the number of detected face areas and associated coordinates and sizes.

Figure 7:
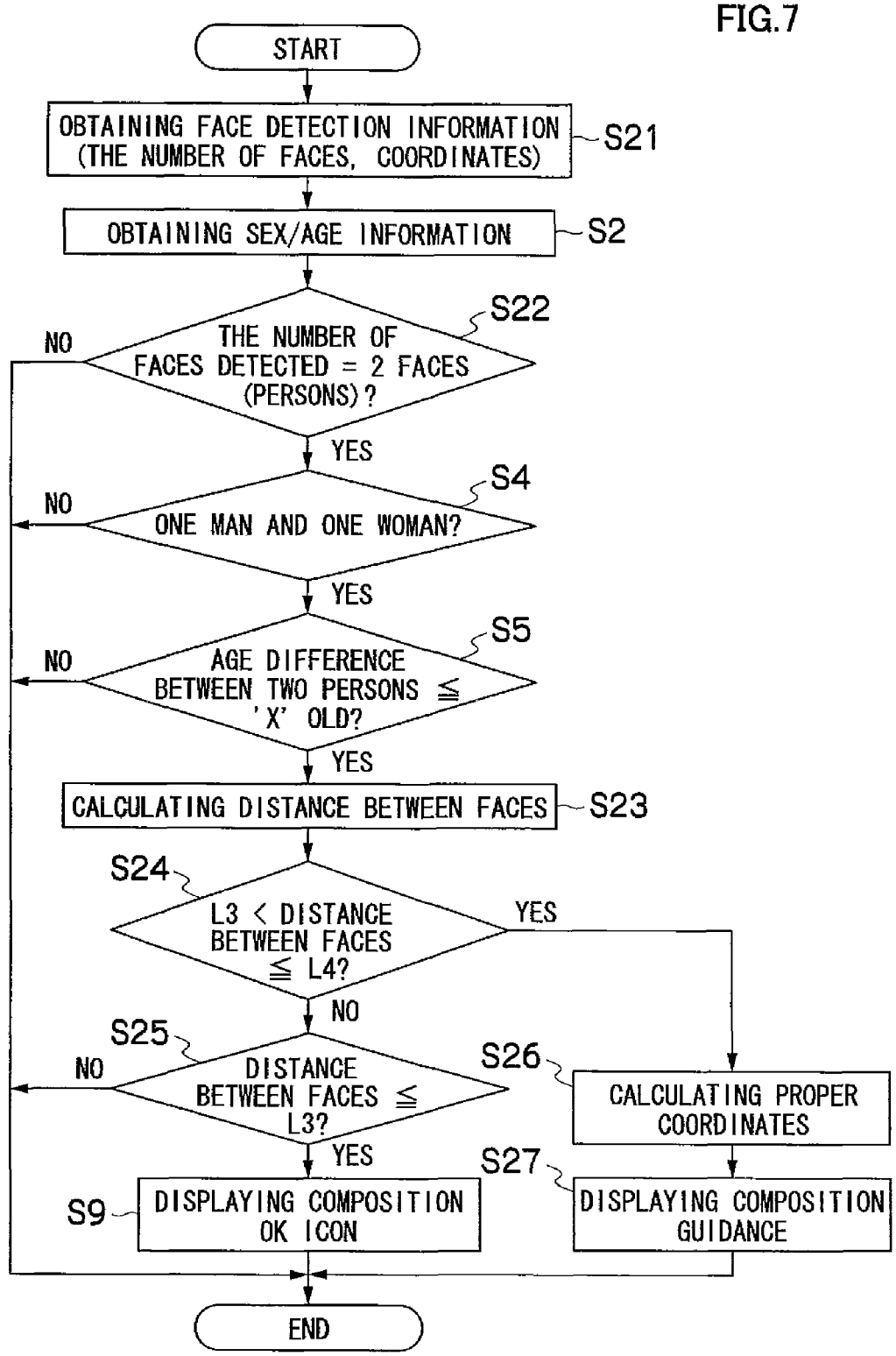
FIG. 7 is a flow chart explaining an operation for carrying out an assistance display according to a second embodiment of the present invention.

Now, a composition assistance display according to the present embodiment of the invention will be described. FIG. 7 is a flow chart explaining an operation in composition assistance shooting according to the second embodiment of the present invention. In the following, the parts which are shared with the flow chart in FIG. 3 will have the same reference codes and detailed descriptions thereof will be omitted for brevity.

When a composition assistance mode is set by the operation unit 17, a through-the-lens image will be displayed, and along with that, faces inside the through-the-lens image are to be detected and the number of detected faces and associated coordinates will be obtained (step S21). As mentioned earlier, the face detection is to be performed by the face detecting circuit 52. With respect to the detected faces, face detection frames 81 are to be displayed in a way overlapping the persons on the through-the-lens image. Moreover, information on age and sex with respect to the detected faces will be obtained (step S2). The age and sex detection is to be performed by the sex/age detecting circuit 51.

Next, based on the detection result at step S21, it is to be determined as to whether the number of detected faces, or in other words the number of detected persons, is two or not (step S22). If it is not two, the process is to end. If the number of persons in the image is two, it is to be determined as to whether the two persons are one man and one woman, based on the detection result at step S2 (step S4). If both of the two persons are men or women, the process is to end. If the two persons are one man and one woman, it is to be determined as to whether their age difference is within a predetermined value or not, based on the detection result at step S2 (step S5). If their age difference is greater than the predetermined value, the process is to end.

If the age difference between the two persons is within the predetermined value, a distance between the faces of the two persons is to be calculated based on the result at step S21 (step S23). A distance $D_{face}$ between adjacent faces is to be calculated using the following expression.

$$D_{face} = W_{f0} \times d_f \div w_f$$  [Expression 2]

Here, the value $w_{f0}$ designates a common horizontal size (unit: m) of a person's face, the value $w_f$ designates a horizontal size (unit: pixel) of the face in the through-the-lens image, and the value $d_f$ designates a distance between face areas (unit: pixel). Generally, considering heights and face sizes of people, face sizes should vary less than heights. Therefore, it should be possible to calculate the distance $D_{face}$ with better accuracy than the distance $D_{person}$ as calculated in the first embodiment.

The distance $D_{face}$ between adjacent faces calculated in such way is to be determined as to whether it is within a range of L3 to L4 not including L3 but L4 (step S24). If the distance $D_{face}$ is not within the range of L3 to L4 not including L3 but L4, it is to be determined as to whether it is L3 or shorter (step S25). If the distance $D_{face}$ is over L4, it will be determined that the two persons as being the photographic subjects do not have any intention of being photographed as being side by side in the first place, and thus the process is to end. If the distance $D_{face}$ is L3 or shorter, it will be determined that the persons are in a proper composition, whereby a composition OK icon 62 is to be displayed (step S9).

Figure 8A:
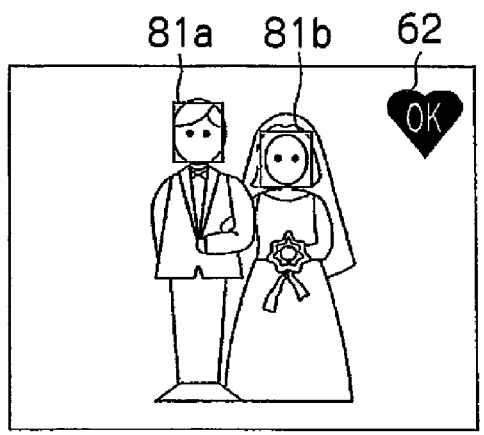
FIGS. 8A to 8C are diagrams showing and explaining assistance displays in a composition assisting mode according to the second embodiment of the present invention.

FIG. 8A is a diagram showing a display on the LCD 114 in this case. As can be noted, in addition to face detection frames 81a and 81b for the two persons of one man and one woman, the composition OK icon 62 is also displayed in a way overlapping the through-the-lens image. By confirming this composition OK icon 62, the photographer can recognize that the photographic subjects are in a proper composition whereby he/she can do the shooting.

In the case when it is determined at step S24 that the calculated distance $D_{face}$ between the adjacent faces is within the range of L3 to L4 not including L3 but L4, it will be determined that the two persons as being the photographic subjects have the intentions of being photographed together as being side by side although they are too apart from each other, and thus proper coordinates for a proper composition are to be calculated (step S26). Proper face positions are positions that can be set by shifting the current face positions in the horizontal direction only, while the center of a distance between the current face positions and the center of a distance between the proper face positions in the horizontal direction, respectively, should coincide and a distance between the centers of the proper face positions should become the proper distance L3. For example, as shown in FIG. 8C, supposing that the current face positions are 91a and 91b, the proper face positions will be 93a and 93b, which are symmetric about a vertical center line 95 that passes through the midpoint of a distance between the current face positions 91a and 91b, and where a distance between the faces of the two persons becomes L3. Coordinates of such proper positions are to be calculated and a composition change instruction icon 64 is to be displayed (step S27).

Figure 8B:
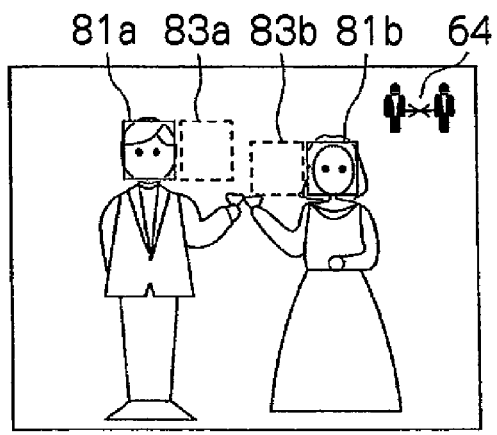
Figure 8C:
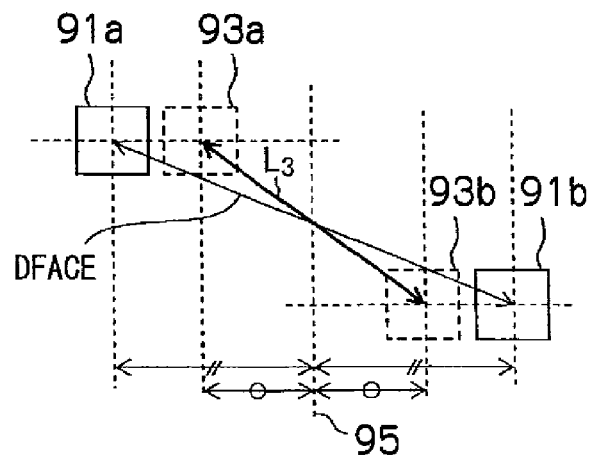

FIG. 8B is a diagram showing a display on the LCD 114 in this case. As can be noted, along with the face detection frames 81a and 81b for the two persons of one man and one woman, proper face position frames 83a and 83b and further the composition change instruction icon 64 are also displayed in a way overlapping the through-the-lens image. These proper face position frames 83a and 83b are displayed on the proper face positions 93a and 93b which are being calculated at step S26. In addition, the proper face position frames 83 should be displayed as blinking with a different color from the face detection frames 81 in order to easily distinguish between the proper face position frames 83 and the face detection frames 81.

Therefore, while looking at these proper face position frames 83a and 83b, the photographer should be able to suggest the two persons as being the photographic subjects to come closer to each other. Moreover, when the composition change instruction icon 64 is turned to the composition OK icon 62 as a result of the two photographic subjects coming close enough to each other, the photographer can recognize that the photographic subjects are in a proper composition whereby he/she can do the shooting.

Third Embodiment

Now, composition assistance according to a third embodiment of the present invention will be described. A digital camera 1 according to the third embodiment of the present invention is to suggest the photographic subjects to come closer to each other by letting the LED 105 emit blinking lights. FIG. 9 is a flow chart explaining an operation in composition assistance shooting according to the third embodiment of the present invention. In the following, the parts which are shared with the flow chart in FIG. 7 will have the same reference codes and detailed descriptions thereof will be omitted for brevity.

The operation covering the steps of detecting two persons of one man and one woman up to step S23 where the distance $D_{face}$ between adjacent faces is detected will be the same as the second embodiment. The distance $D_{face}$ between adjacent faces is to be determined as to whether it is within a range of L3 to L4 not including L3 but L4 (step S24). If the distance $D_{face}$ is not within the range of L3 to L4 not including L3 but L4, it is to be determined as to whether it is L3 or shorter (step S25). If the distance $D_{face}$ is over L4, it will be determined that the two persons as being the photographic subjects do not have any intention of being photographed as being side by side in the first place, and thus the process is to end. On the other hand, if the distance $D_{face}$ is L3 or shorter, it will be determined that the persons are in a proper composition, whereby the LED 105 will emit light constantly (step S31). By confirming the constant emission of light from the LED 105, the man and the woman as being the photographic subjects can recognize that the distance between the two is proper.

In the case when it is determined at step S24 that the calculated distance $D_{face}$ between the adjacent faces is within the range of L3 to L4 not including L3 but L4, it will be determined that the two persons as being the photographic subjects have the intentions of being photographed together as being side by side although they are too apart from each other, and thus proper coordinates for a proper composition are to be calculated (step S26). The calculation for the proper coordinates will be done in the same way as in the second embodiment.

Next, based on the distance $D_{face}$ between adjacent faces calculated at step S23, a light emitting frequency of the LED 105 is to be calculated (step S32). Such LED light emitting frequency $f_{LED}$ is to be calculated using the following expression.

$$f_{LED}=k_{LED}\times(D_{face}-L3)\div L3 \qquad \text{[Expression 3]}$$

Here, the value $k_{LED}$ designates a coefficient.

In this way, the light emitting frequency $f_{LED}$ of the LED 105 is set to become faster as the distance $D_{face}$ between adjacent faces becomes shorter. Emission of light by the LED 105 is to be carried out at this calculated light emitting frequency $f_{LED}$ (step S33).

Therefore, by confirming blinking lights from the LED 105, the man and the woman as being the photographic subjects can confirm that they are distant from each other, and as they come closer to each other, they can make the LED 105 emit light constantly at which point they can recognize that the distance between the two is proper. Such arrangements should prove effective in a case where there is no photographer for checking the LCD 114 and self timer is to be used for shooting.

In the present embodiment of the invention, in the case when the photographic subjects are distant from each other, the LED 105 is to emit blinking lights at a frequency depending on the distance between the photographic subjects, whereas in the case when they are in a proper composition, the LED 105 is to emit light constantly. However, it is also possible to use a two-color LED and change the color of light to be emitted from the LED 105 between the case of notifying a proper composition and the other cases.

Fourth Embodiment

Now, composition assistance according to a fourth embodiment of the present invention will be described. A digital camera 1 according to the fourth embodiment of the present invention is to suggest the photographic subjects to come closer to each other by outputting a sound from the speaker 106. FIG. 10 is a flow chart explaining an operation in composition assistance shooting according to the fourth embodiment of the present invention. In the following, the parts which are shared with the flow chart in FIG. 7 will have the same reference codes and detailed descriptions thereof will be omitted for brevity.

The operation covering the steps of detecting two persons of one man and one woman up to step 823 where the distance $D_{face}$ between adjacent faces is detected will be the same as the other embodiments. The distance $D_{face}$ between adjacent faces is to be determined as to whether it is within a range of L3 to L4 not including L3 but L4 (step S24). If the distance $D_{face}$ is not within the range of L3 to L4 not including L3 but L4, it is to be determined as to whether it is L3 or shorter (step S25). If the distance $D_{face}$ is over L4, it will be determined that the two persons as being the photographic subjects do not have any intention of being photographed as being side by side in the first place, and thus the process is to end. On the other hand, if the distance $D_{face}$ is L3 or shorter, it will be determined that the persons are in a proper composition, whereby the speaker 106 will output a composition OK melody (step S41). By confirming this composition OK melody, the man and the woman as being the photographic subjects can recognize that the distance between the two is proper.

In the case when it is determined at step S24 that the calculated distance $D_{face}$ between the adjacent faces is within the range of L3 to L4 not including L3 but L4, it will be determined that the two persons as being the photographic subjects have the intentions of being photographed together as being side by side although they are too apart from each other, and thus proper coordinates for a proper composition are to be calculated (step S26). The calculation for the proper coordinates will be done in the same way as in the other embodiments.

Next, based on the distance $D_{face}$ between adjacent faces calculated at step S23, a frequency of the sound to be outputted from the speaker 106 is to be calculated (step S42). Such output frequency $f_{SOUND}$ is to be calculated using the following expression.

$$f_{SOUND}=k_{SOUND}\times L3\div(D_{face}-L3) \qquad \text{[Expression 4]}$$

Here, the value $k_{SOUND}$ designates a coefficient.

In this way, the calculation format is predetermined so that the output frequency $f_{SOUND}$ should become higher as the distance $D_{face}$ between adjacent faces becomes shorter. A sound at this calculated frequency $f_{SOUND}$ is to be outputted from the speaker 106 (step S43).

Therefore, by confirming such output sound, the man and the woman as being the photographic subjects can confirm that they are distant from each other, and as they come closer to each other, they can have the composition OK melody outputted and thus they can recognize that the distance between the two is proper. Such arrangements should prove effective in a case where there is no photographer for checking the LCD 114 and self timer is to be used for shooting.

In the present embodiment of the invention, a melody is to be outputted in the case when the composition is proper. However, in stead of outputting the melody, it is also possible to output a sound at a frequency different from those in the case when the distance between adjacent faces is longer than L3. Moreover, in the case when the distance between adjacent faces is longer than L3, a sound at a frequency that changes depending on the distance between adjacent faces is to be outputted. However, it is also possible to output a sound at the same frequency but with a changing volume.

Furthermore, in stead of a sound or a melody, it is also possible to have the speaker 106 output a voice to suggest the photographic subjects to come closer to each other.

What is claimed is:

1. An imaging device, comprising:
   an image pickup device which converts an optical image of a photographic subject received through an imaging lens into an image signal;
   a displaying device which displays a through-the-lens image based on the image signal;
   a person detecting device which detects one or more persons from the image signal;
   a distance calculating device which calculates a distance between a plurality of the detected persons;
   a composition assisting device which displays on the displaying device information as to whether the distance between the detected persons is proper or not based on the calculated distance between the detected persons;
   a determining device which determines as to whether the calculated distance between the detected persons is longer than a first predetermined distance which is a proper distance; and
   a calculating device which calculates proper person positions for a proper composition with respect to the plurality of detected persons, wherein the composition assisting device lets frames be displayed on the calculated proper person positions for the proper composition in a case when the determining device determines that the distance between the detected persons is longer than the first predetermined distance.

2. The imaging device according to claim 1, wherein the proper person positions for the proper composition are defined as positions where the distance between the detected persons becomes the first predetermined distance, and where the positions of the plurality of the detected persons are shifted to become mutually symmetric about a vertical line that passes through the center of a lateral line connecting the positions of the plurality of the detected persons.

3. The imaging device according to claim 2, wherein the person detecting device is to detect one or more faces of persons.

4. The imaging device according to claim 3, further comprising:
a sex determining device which determines sexes of the detected persons; and
a device which enables the composition assisting device in a case when the plurality of the detected persons are one man and one woman and disables the composition assisting device in other cases.

5. The imaging device according to claim 4, further comprising:
an age determining device which determines ages of the plurality of the detected persons; and
a device which enables the composition assisting device in a case when an age difference between the plurality of the detected persons is within a predetermined age and disables the composition assisting device in a case when the age difference between the plurality of the detected persons is over the predetermined age.

6. The imaging device according to claim 5, further comprising:
a storing device which stores a second predetermined distance being larger than the first predetermined distance; and
a device which enables the composition assisting device in a case when the distance between the detected persons is shorter than or equal to the stored second predetermined distance and disables the composition assisting device in a case when the distance between the detected persons is longer than the stored second predetermined distance.

7. The imaging device according to claim 6, further comprising:
an input device which allows a user to set a shooting mode, wherein
the input device can be set to one of the shooting modes including a shooting mode that enables the composition assisting device and a shooting mode that disables the composition assisting device.

8. The imaging device according to claim 1, wherein the person detecting device is to detect one or more faces of persons.

9. The imaging device according to claim 1, further comprising:
an input device which allows a user to set a shooting mode, wherein
the input device can be set to one of the shooting modes including a shooting mode that enables the composition assisting device and a shooting mode that disables the composition assisting device.

10. An imaging device, comprising:
an image pickup device which converts an optical image of a photographic subject received through an imaging lens into an image signal;
a displaying device which displays a through-the-lens image based on the image signal;
a person detecting device which detects one or more persons from the image signal;
a distance calculating device which calculates a distance between a plurality of the detected persons;
a composition assisting device which displays on the displaying device information as to whether the distance between the detected persons is proper or not based on the calculated distance between the detected persons;
a sex determining device which determines sexes of the detected persons; and
a device which enables the composition assisting device in a case when the plurality of the detected persons are one man and one woman and disables the composition assisting device in other cases.

11. An imaging device comprising:
an image pickup device which converts an optical image of a photographic subject received through an imaging lens into an image signal;
a displaying device which displays a through-the-lens image based on the image signal;
a person detecting device which detects one or more persons from the image signal;
a distance calculating device which calculates a distance between a plurality of the detected persons;
a composition assisting device which displays on the displaying device information as to whether the distance between the detected persons is proper or not based on the calculated distance between the detected persons;
an age determining device which determines lines ages of the plurality of the detected persons; and
a device which enables the composition assisting device in a case when an age difference between the plurality of the detected persons is within a predetermined age and disables the composition assisting device in a case when the age difference between the plurality of the detected persons is over the predetermined age.

12. An imaging device comprising:
an image pickup device which converts an optical image of a photographic subject received through an imaging lens into an image signal;
a displaying device which displays a through-the-lens image based on the image signal;
a person detecting device which detects one or more persons from the image signal;
a distance calculating device which calculates a distance between a plurality of the detected persons;
a composition assisting device which displays on the displaying device information as to whether the distance between the detected persons is proper or not based on the calculated distance between the detected persons;
a storing device which stores a second predetermined distance being larger than a first predetermined distance; and
a device which enables the composition assisting device in a case when the distance between the detected persons is shorter than or equal to the stored second predetermined distance and disables the composition assisting device in a case when the distance between the detected persons is longer than the stored second predetermined distance.

* * * * *